(12) United States Patent
Bickford et al.

(10) Patent No.: US 9,740,815 B2
(45) Date of Patent: Aug. 22, 2017

(54) ELECTROMIGRATION-AWARE INTEGRATED CIRCUIT DESIGN METHODS AND SYSTEMS

(71) Applicant: GlobalFoundries Inc., Grand Cayman (KY)

(72) Inventors: Jeanne P. Bickford, Essex Junction, VT (US); Alok Chandra, Bangalore (IN); Anand Kumaraswamy, Bangalore (IN); Sandeep Prajapati, Bangalore (IN); Venkatasreekanth Prudvi, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 4 days.

(21) Appl. No.: 14/922,256

(22) Filed: Oct. 26, 2015

(65) Prior Publication Data

US 2017/0116367 A1    Apr. 27, 2017

(51) Int. Cl.
*G06F 17/50* (2006.01)

(52) U.S. Cl.
CPC ........ *G06F 17/5081* (2013.01); *G06F 17/505* (2013.01); *G06F 17/5072* (2013.01)

(58) Field of Classification Search
CPC .................................................. G06F 17/5081
USPC ....................................................... 716/115
See application file for complete search history.

(56) References Cited

U.S. PATENT DOCUMENTS

| | | |
|---|---|---|
| 6,581,201 B2 | 6/2003 | Cano et al. |
| 6,675,139 B1 | 1/2004 | Jetton et al. |
| 6,823,500 B1 | 11/2004 | Ganesh et al. |
| 7,103,863 B2 | 9/2006 | Riepe et al. |
| 7,272,810 B2 | 9/2007 | Orita |
| 7,458,045 B2 | 11/2008 | Cote et al. |
| 7,861,198 B2 | 12/2010 | Ding et al. |
| 8,187,924 B2 | 5/2012 | Nakajima et al. |
| 8,255,840 B2 | 8/2012 | Cote et al. |
| 8,595,662 B1 | 11/2013 | Yu et al. |
| 8,694,945 B2 | 4/2014 | Wang et al. |
| 8,694,950 B2 | 4/2014 | McSherry et al. |
| 8,701,067 B1 | 4/2014 | McSherry et al. |

(Continued)

FOREIGN PATENT DOCUMENTS

WO    2012018571 A1    2/2012

*Primary Examiner* — Suresh Memula
(74) *Attorney, Agent, or Firm* — Gibb & Riley, LLC; David A. Cain, Esq.

(57) ABSTRACT

Disclosed are electromigration (EM)-aware integrated circuit (IC) design techniques, which consider EM early in the IC design process in order to generate, in a timely manner, an IC design that can be used to manufacture IC chips that will exhibit minimal EM fails for improved IC reliability. Specifically, prior to placement of library elements, EM-relevant information is acquired and used to define protected zones around at least some of the library elements. Once the protected zones are defined, the library elements are placed relative to power rails in a previously designed power delivery network (PDN) and this placement process is performed such that each library element is prevented from being placed in a protected zone around any other library element to avoid EM fails in the PDN. Optionally, this same EM-relevant information is used during subsequent synthesis of a clock distribution network to prevent EM fails therein.

20 Claims, 8 Drawing Sheets

(56) References Cited

U.S. PATENT DOCUMENTS

| | | | |
|---|---|---|---|
| 2008/0141196 A1* | 6/2008 | Ohshima | G06F 17/5068 |
| | | | 716/112 |
| 2010/0314769 A1* | 12/2010 | Braeckelmann | H01L 21/76831 |
| | | | 257/762 |
| 2015/0269302 A1* | 9/2015 | Katta | G06F 17/5072 |
| | | | 716/120 |
| 2015/0302128 A1* | 10/2015 | Katta | G06F 17/5072 |
| | | | 716/120 |
| 2016/0063171 A1* | 3/2016 | Tripathi | G05B 19/418 |
| | | | 716/136 |
| 2016/0267215 A1* | 9/2016 | Folberth | G06F 17/5077 |

* cited by examiner

… (1)

ELECTROMIGRATION-AWARE INTEGRATED CIRCUIT DESIGN METHODS AND SYSTEMS

FIELD OF THE INVENTION

The present invention relates to integrated circuit (IC) design and, more particularly, to electromigration-aware IC design methods, systems and computer program products.

BACKGROUND

Electromigration (EM) fails are becoming more and more problematic with newer IC technologies. More specifically, EM is generally understood to be the movement of metal ions due to an electric field. This movement of metal ions can cause voids within and/or shorts between the wires and vias that make up the various interconnect networks, including the power delivery network (also referred to as the power bus) and the clock distribution network (also referred to as the clock tree), on an IC. These voids and shorts are referred to collectively as EM fails and they are more likely to occur in the interconnect networks of newer IC technologies because of the higher operating frequencies and smaller chip sizes that lead to increased circuit density and more narrow metals widths and that, thereby lead to decreased current carrying capabilities in the interconnects and increased current density (i.e., more interconnects in given area). Therefore, there is a need in the art for improved EM-aware design methods and systems.

SUMMARY

Disclosed herein are electromigration (EM)-aware integrated circuit (IC) design methods. In the methods, technology files for a specific technology node, design specifications for a design of an IC in the specific technology node and library files for library elements in the design can be stored (e.g., in a memory). The technology files, design specifications and library files can be accessed and used (e.g., by a processor) early in the design process in order to generate, in a timely manner, a final IC design layout that can be used to manufacture IC chips that will exhibit minimal EM fails for improved IC reliability. Specifically, prior to library element placement, information that impacts EM (i.e., EM-relevant information) can be acquired directly and/or indirectly from the technology files, design specifications and library files and used to define protected zones around at least some of those library elements. Once the protected zones are defined, placement of the library elements relative to power rails in a previously designed power delivery network for the IC can be established. This library element placement process can be performed such that each library element is prevented from being placed in a protected zone around any other library element, thereby avoiding EM fails in the power deliver network. Optionally, a clock distribution network can also be synthesized (e.g., by the processor) using this same EM-relevant information in order to prevent EM fails therein.

Also, disclosed herein are electromigration (EM)-aware integrated circuit (IC) design systems. Each system incorporates a memory and at least one processor in communication with the memory. The memory can store technology files for a specific technology node, design specifications for a design of an IC in the specific technology node and library files for library elements in the design. The processor can access the memory and use the technology files, design specifications and library files early in the design process in order to generate, in a timely manner, a final IC design layout that can be used to manufacture IC chips that will exhibit minimal EM fails for improved IC reliability. Specifically, prior to library element placement, which occurs relatively early in the IC design process, the processor can acquire information that impacts EM (i.e., EM-relevant information). This EM-relevant information can be acquired directly and/or indirectly from the technology files, design specifications and library files. The processor can then use this EM-relevant information to define protected zones around at least some of those library elements. Once the protected zones are defined, the processor can establish placement of the library elements relative to power rails in a previously designed power delivery network for the IC. This library element placement process can be performed such that each library element is prevented from being placed in a protected zone around any other library element, thereby avoiding EM fails in the power deliver network. Optionally, the processor can further use this same EM-relevant information during subsequent synthesis of a clock distribution network in order to prevent EM fails therein.

Also disclosed herein is a computer program product for electromigration (EM)-aware integrated circuit (IC) design. The computer program product can be a computer readable storage medium with program instructions embodied therewith (e.g., stored thereon). These program instructions can be executable by a processor to cause the processor to perform the above-described integrated circuit design method.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
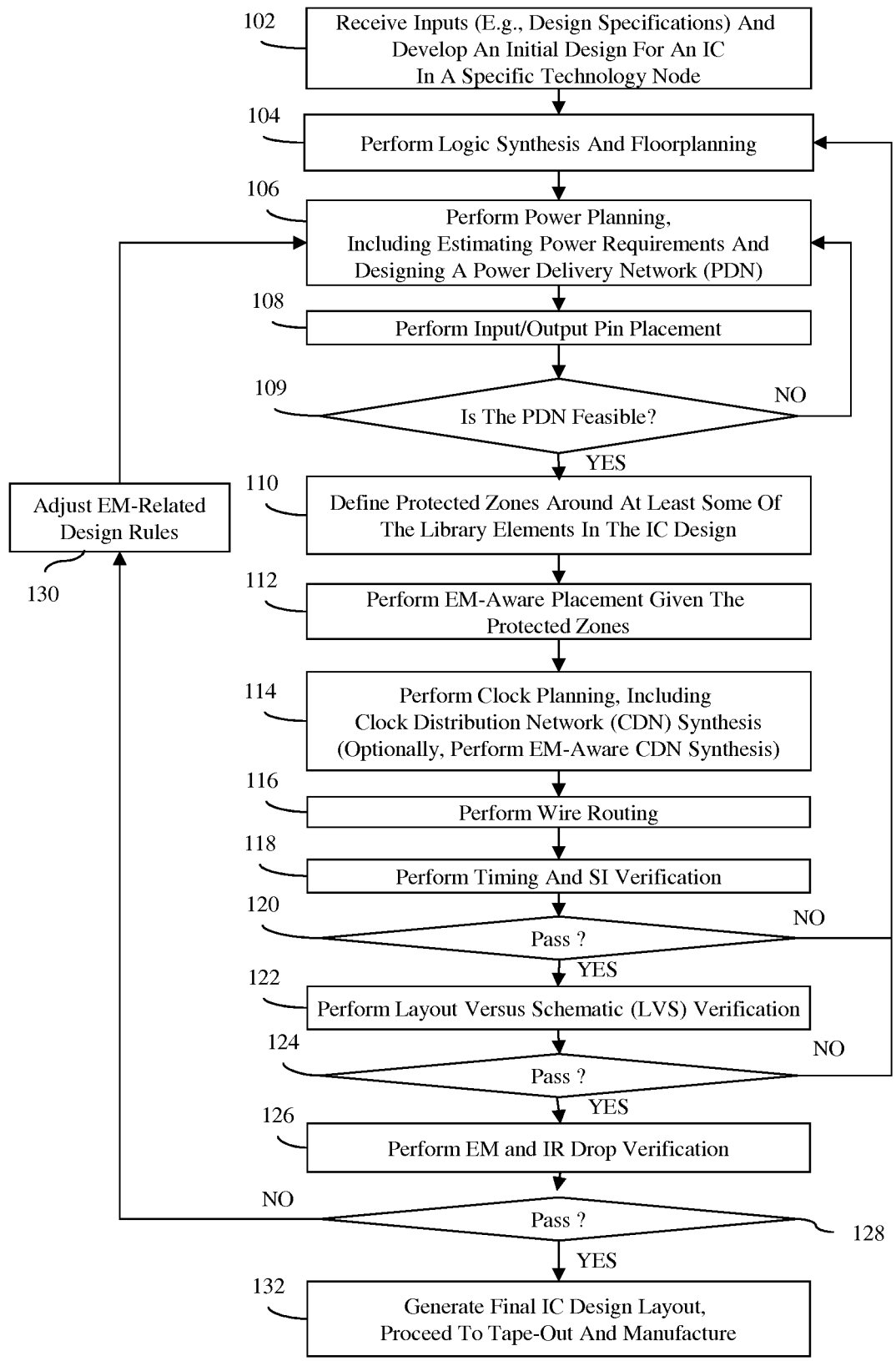
FIG. 1 is a flow diagram illustrating an electromigration (EM)-aware integrated circuit (IC) design method.

As mentioned above, electromigration (EM) fails are becoming more and more problematic with newer IC technologies. More specifically, EM is generally understood to be the movement of metal ions due to an electric field. This movement of metal ions can cause voids within and/or shorts between the wires and vias that make up the various interconnect networks, including the power delivery network (also referred to as the power bus) and the clock distribution network (also referred to as the clock tree or mesh), on an IC. These voids and shorts are referred to collectively as EM fails and they are more likely to occur in the interconnect networks of newer IC technologies because of the higher operating frequencies and smaller chip sizes that lead to increased circuit density and more narrow metals widths and that, thereby lead to decreased current carrying capabilities in the interconnects and increased current density (i.e., more interconnects in given area).

Current IC design systems and methods typically perform the following processes in sequence: floorplanning, power planning, input/output (I/O) pin placement, library element placement, clock distribution network (e.g., clock tree) synthesis, wire routing, timing and signal integrity verification, physical verification to check the correctness of the layout of the design, and electromigration (EM) and voltage drop (also referred to in the art as IR drop) verification. Thus, EM and IR drop verification occurs late in the design process (e.g., after the physical verification process and just prior to tape out). However, if, during EM and IR drop verification, it is determined that EM and IR drop verification requirements are not met, the IC design must be completely reworked and, specifically, the processes of power planning, I/O pin placement, library element placement, clock distribution network (e.g., clock tree) synthesis, wire routing, timing and signal integrity verification, physical verification and EM and IR drop verification must be iteratively repeated. Completely reworking the IC design in this manner adds a significant amount of time to the IC design process.

In view of the foregoing, disclosed herein are electromigration (EM)-aware integrated circuit (IC) design methods, systems and computer program products, which consider EM early in the IC design process in order to generate, in a timely manner, an IC design that can be used to manufacture IC chips that will exhibit minimal EM fails for improved IC reliability. Specifically, prior to placement of library elements in the design, EM-relevant information can be acquired and used to define protected zones around at least some of the library elements. Once the protected zones are defined, the library elements can be placed relative to power rails in a previously designed power delivery network for the IC and this placement process can be performed such that each library element is prevented from being placed in a protected zone around any other library element in order to avoid EM fails in the power deliver network. Optionally, this same EM-relevant information can be used during subsequent synthesis of a clock distribution network to prevent EM fails therein.

More particularly, referring to the flow diagram of FIG. 1, disclosed herein are electromigration (EM)-aware integrated circuit (IC) design methods. The methods can be implemented using design information, for example, in the form of a process design kit (PDK), which is stored in a memory and which is accessible by one or more processors of a design system executing electronic design automation (EDA) tools on a computer-aided design (CAD) system for the purpose of designing an integrated circuit. The design information (e.g., the PDK) can include a set of foundry-specific files including, but not limited to, technology files for a specific technology node, a library element library, design rules, etc. Those skilled in the art will recognize that a specific "technology node", which is also referred to as a specific "process node," is typically identified in nanometers (e.g., a 45 nm, 32 nm, 22 nm, etc.), thereby indicating the size of the semiconductor features that can be formed on a wafer. The technology node may also indicate the type of wafer, such as a silicon-on-insulator (SOI) wafer (e.g., 45 nm SOI, 32 nm SOI, 22 nm SOI, etc.).

The technology files can define the layers and devices that are available for a particular fabrication process as well as the generic physical and electrical rules for the specific technology node. For example, the technology files can contain generic EM-relevant information about metal layers used in the specific technology node and, particularly, can specify the attributes of the metal layers used in the specific technology node (e.g., the wire material, wire width, wire thickness, wire length, etc.).

The library element library can list multiple different library elements that can be incorporated into an IC under design in the specific technology node and, specifically, can contain library files (.libs) for each of those library elements. The library elements can be, for example, standard cells. Those skilled in the art will recognize that a standard cell typically includes a group of one or more transistors and the interconnect structure(s) that connect those transistors and can provide a logic function or a storage function. The library elements can also be standard blocks for memories, core processors, etc. In any case, the library files (.libs) can contain library information about the library elements, respectively, and this library information can include, but is not limited to, the specific attributes of the library element (e.g., the transistors, interconnects, etc.), the pin characteristics (e.g., capacitance, timing, etc.) for the library element, the timing information for the library element (e.g., a delay model), and other library element-specific information. This library element-specific information can include, but is not limited to, the widths of various threshold voltage (VT)-type transistors (e.g., for regular threshold voltage (RVT) transistors, high threshold voltage (HVT) transistors, mezzanine threshold voltage (MVT) transistors, super-high threshold voltage (SHVT) transistors, low threshold voltage (LVT) transistors, ultra-high threshold voltage (UHVT) transistors, etc.) in the library element as well as leakage models for those various threshold voltage (VT)-type transistors. Those skilled in the art will recognize that these leakage models can indicate how the different VT-type transistor will vary as a function of changes in voltage and temperature.

The design rules can include rule decks (also referred to as sets of rules or run sets) for one or more of the particular processes (e.g., a power planning rule deck, an input/output pin placement rule deck, a library element placement rule deck, a clock planning rule deck, and a wire routing rule deck) in the design flow. These rule decks can be foundry-specific.

In the methods, the technology files, design specifications and library files can be accessed from memory and used early in the design process in order to, in a timely manner, generate and store a final IC design layout that can be used to manufacture IC chips that will exhibit minimal EM fails for improved IC reliability. Specifically, in the methods, design inputs for an IC in a specific technology node (e.g., design specifications) can be received (e.g., by a processor from a designer via a graphic user interface (GUI)). The design specifications can be stored in memory and an initial design for the IC can be developed based on the design specification (102). This initial design can be represented by a high-level description, which sets out the requirements for the IC chip. This high-level description can be stored in memory (e.g., on a data storage device) in, for example, a hardware description language (HDL), such as VHDL or Verilog. Those skilled in the art will recognize that this high-level description will set out specifications for various parameters (e.g., for channel length, channel width, doping, spacer width, etc.).

Following development of the initial design, logic synthesis and floorplanning can be performed (104). Specifically, during logic synthesis, the high-level description can be synthesized into a gate-level netlist, which describes the connectivity of the IC in terms of nets. Each net is listed in the netlist and is a conductor that interconnects two or more component terminals. In library element-based design, the high-level description can be synthesized into the netlist using library elements selected from the library element library. During floorplanning, the size of the IC chip, the placement of customized functional blocks, the placement of the area(s) for library elements, etc. can be determined.

Figure 2:
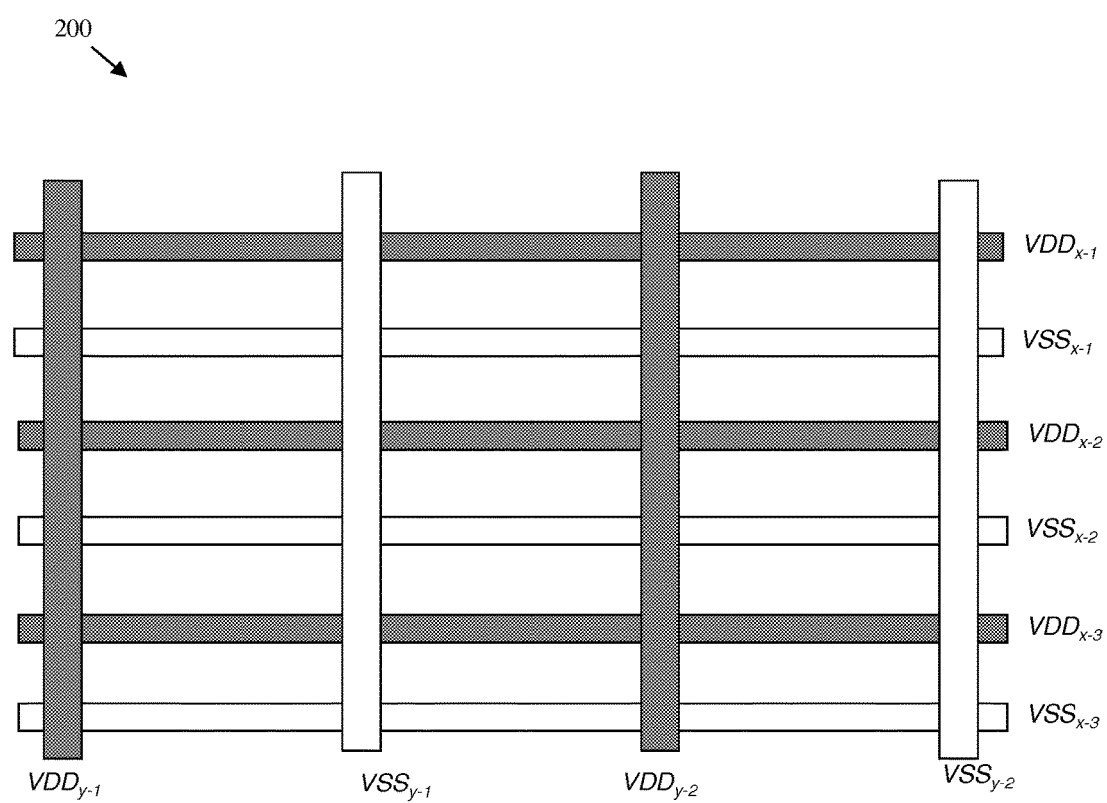
FIG. 2 is a top view diagram illustrating a portion of an exemplary power grid designed for an integrated circuit according to the method of FIG. 1.

Power planning for the IC can then be performed (106). Specifically, during power planning, the power requirements for the IC can be estimated (e.g., based on the design specifications) and a power delivery network (PDN) (also referred herein as a power bus or grid) can be designed for the IC based on the power requirements and the floorplan. Such power planning can be performed based on power-relevant information including, but not limited to, the temperature and voltage use conditions indicated for the IC, the specific library elements (i.e., the specific library elements selected for the IC, and the switching frequency of each net in the IC. This power-relevant information can be used to determine the amount of current in each net (i.e., the amount of power required for each net to operate). Once the amount of power required for each net is determined, the PDN can be created so that it is configured to deliver to each net the amount of power required for that net to operate. Such power planning can, for example, be performed according to a power planning rule deck. Techniques for power planning are well known in the art. Thus, the details of the power planning process are omitted from this specification in order to allow the reader to focus on the salient aspects of the disclosed method. In any case, FIG. 2 illustrates a portion of an exemplary power grid 200, which is designed at process 106 and which incorporates multiple power rails comprising alternating positive supply voltage and ground power rails (i.e. alternating VDD and VSS wires) running in the x-direction and overlaid by alternating positive supply voltage and ground power rails (i.e., alternating VDD and VSS wires) running in the y-direction.

Following power planning at process 106, input/output (I/O) pin placement can be performed (108). Specifically, the I/O pads and buffers can be placed based on the floorplan and the design of the PDN. Such I/O pin placement can, for example, be performed according an I/O pin placement rule deck. Techniques for I/O pin placement are well known in the art. Thus, the details of the I/O pin placement process are omitted from this specification in order to allow the reader to focus on the salient aspects of the disclosed method.

Next, information that impacts EM (i.e., EM-relevant information) can be acquired directly and/or indirectly from the technology files, design specifications and library files and used to determine whether the design and, particularly, the PDN is feasible (109) and, if so, to define protected zones (also referred to herein as keepout zones) around at least some of the library elements in the design (110). For purposes of this disclosure, a feasible PDN is one in which the maximum current carrying capacity of the power rails in the PDN is sufficient to accommodate current carrying amounts of the library elements that are to be incorporated into the design, as discussed in greater detail below. If it is determined at process 109 that the PDN is not feasible, then the process 106 of designing a PDN must be repeated before processing to process 110. If the PDN is determined to be feasible at process 109, then protected zones can be defined at process 110 according to design rules (e.g., as set forth in a library element placement rule deck), which indicate when a library element should be surrounded by a protected zone and which further indicate how the size of the protected zone should be limited.

Figure 3:
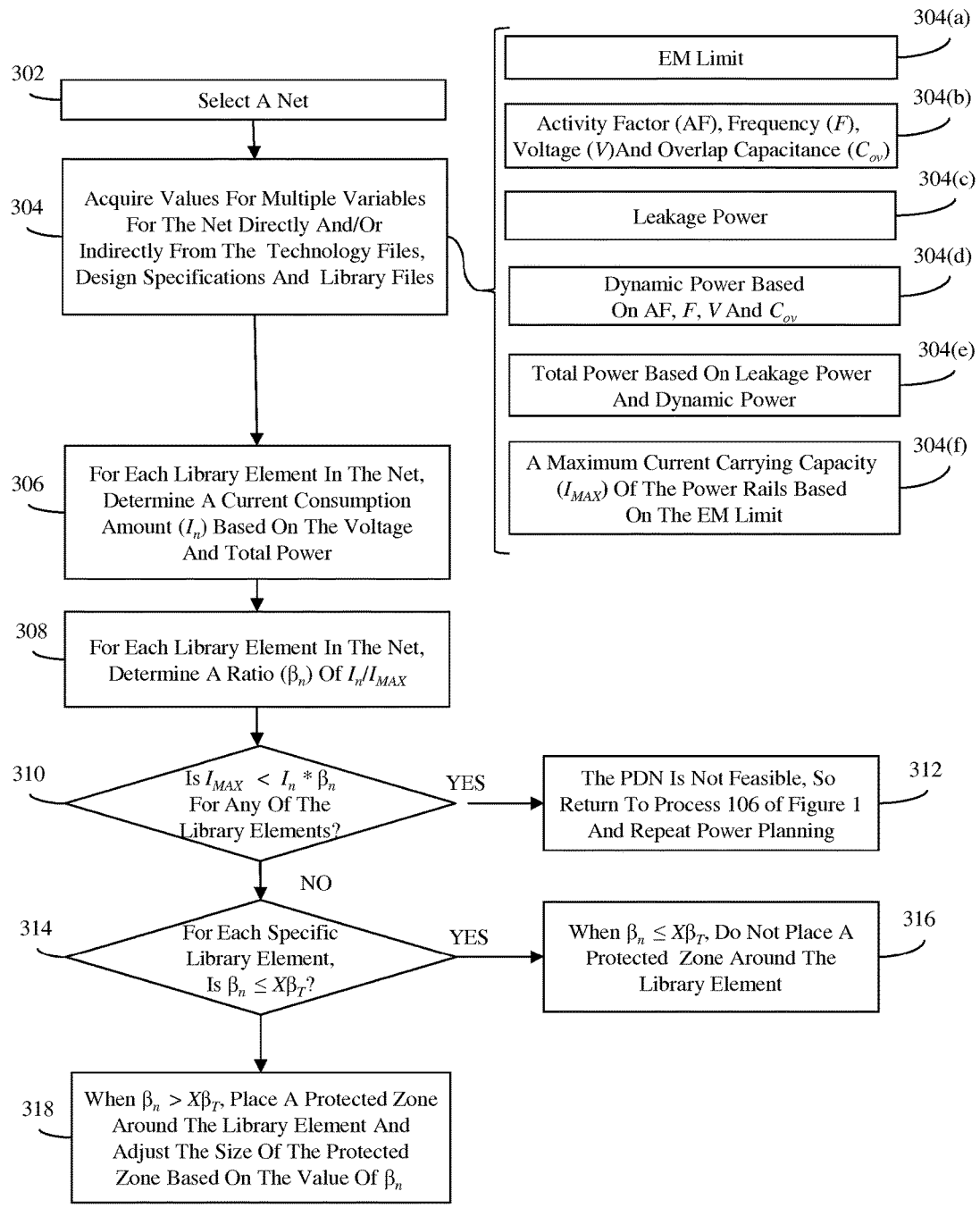
FIG. 3 is a flow diagram illustrating in greater detail process 110 of FIG. 1.

In order to determine whether the PDN is feasible at process 109 and, if so, to define protected zones around at least some of the library elements in the design at process 110, the following processes illustrated in the flow diagram of FIG. 3 can be performed. A net in the design can be selected (302) and, for that net, values for multiple variables that impact EM in the PDN can be acquired directly and/or indirectly using the technology files, the design specifications and the library files (304). These variables can include, but are not limited to the following: an electromigration (EM) current limit for the net (304(a)), an activity factor (AF), a switching frequency (F), a voltage (V) and an overlap capacitance ($C_{ov}$) for the net (304(b)); a leakage power amount for the net (304(c)); a dynamic power amount for the net (304(d)); a total power (P) amount for the net (304(e)); and a maximum current carrying capacity ($I_{MAX}$) for the power rails in the PDN supplying power to the net (304(f)).

Specifically, the EM current limit for the net can be determined, for example, based on Black's equation and using both generic metal information (e.g., wire width, wire thickness, and wire length) acquired from the technology file and specific metal information associated with the net (e.g., the amount of wire in the net) from the design specifications. Those skilled in the art will recognize that each technology displays EM sensitivity (i.e., a sensitivity to EM fails) based on the composition of the metal used and on the cross sectional area of the wires. This EM sensitivity will vary as a function of temperature. For a given metal cross section at a particular temperature, an EM current limit can be defined and this EM current limit is a current threshold below which EM of metal ions in the wires will not occur and above which EM of metal ions in the wires will occur.

The activity factor (AF), switching frequency (F), and voltage (V) values for the net can each be acquired from the design specifications. Those skilled in the art will recognize that the AF is an indication of how active the net will be given the performance requirements for the net and is typically expressed in the design specifications as a percentage of time that the net is active. Additionally, the AF correlates to the switching frequency (F) of the net or, more particularly, the frequency at which switching of devices occurs within the net. The voltage (V) is typically preset in order to meet specific performance requirement(s). The overlap capacitance ($C_{ov}$) for the net can be acquired from the library files and refers to the internal capacitance of the library element including the capacitance of gate to source overlap, gate to drain overlap, and metal capacitance.

The leakage power amount for the net can be determined, for example, based on FETWIDTH amounts for the various different VT-type transistors in the net and leakage models for the different VT-type transistors. Specifically, those skilled in the art will recognize that each of the various different VT-type transistors in a net will have a different leakage per area of the device. Thus, in order to determine the overall leakage power amount for the net, FETWIDTH amounts for each of the different VT-type transistors in the net should first be determined. For each specific VT-type transistor in the net, a FETWIDTH amount can be determined as the sum of the area within the net of all transistors of that specific VT-type. Next, leakage amounts corresponding to the different VT-type transistors in the net should be determined. Each leakage amount corresponding to a specific VT-type transistor in the net can be calculated by multiplying the FETWIDTH amount for that specific VT-type transistor by the expected leakage for that specific VT-type transistor (given the leakage model) at a particular temperature and voltage. Then, the total leakage amount for the net can be calculated as the sum of the leakage amounts for the various different VT-type transistors in the net. Information indicating the different VT-type transistors and areas of those transistors in each library element in the net can be acquired from the library files for those library elements. The leakage models for the different VT-type transistors can be acquired from the .lib file.

The dynamic power (also referred to herein as the active power) for the net can be determined based on the previously determined values for the AF, F, V and $C_{ov}$ using the following equation:

$$\text{Dynamic Power} = AF * V^2 * C_{ov} * F, \quad (1)$$

where, as mentioned above, AF refers to the activity factor for the net, V represents a voltage value, $C_{ov}$ represents an overlap capacitance value and where F represents the frequency at which switching of devices occurs within the net.

The total power (P) for the net can be calculated as the sum of leakage power and the dynamic power at the maximum temperature and voltage allowed for that net, as used within the IC.

The maximum current carrying capacity ($I_{MAX}$) of the power rails in the portion of the PDN associated with the net can be defined using the previously determined EM current limit. For example, the maximum current carrying capacity ($I_{MAX}$) can be defined so that it is equal to the EM current limit. Alternatively, the maximum current carrying capacity ($I_{MAX}$) can be defined pessimistically. For example, the maximum current carrying capacity ($I_{MAX}$) can be defined so that it has a smaller value than the EM current limit and, particularly, so that its value is some percentage (e.g., 95%, 90%, 85%, etc.) of the EM current limit.

Next, current consumption amounts (i.e., $I_1, I_2, I_3, \ldots I_n$) for each of the library elements in the net can be determined based on the previously determined total power of the net at the maximum temperature and voltage (306). That is, a specific current consumption amount can be determined for each specific library element in the net. Those skilled in the art will recognizes that each current consumptions amount for each of the specific library element can be determined by solving the following equation:

$$I_n = P/V, \quad (2)$$

where P and V represents the previously determined values for the total power and the voltage, respectively.

Additionally, current consumption to maximum current carrying capacity ratios (i.e., $\beta 1, \beta 2, \beta 3, \ldots \beta n$) for each of the library elements in the net can be determined (308). Specifically, for each library element, the ratio (i.e., $\beta 1, \beta 2, \beta 3, \ldots \beta n$) of the previously determined current consumption amount for that library element (i.e., $I_1, I_2, I_3, \ldots I_n$) to the maximum current carrying capacity ($I_{MAX}$) can be determined. The value of $\beta$ will be relatively low for library elements with low current consuming amounts and relatively high for library elements with high current consuming amounts.

Next, the feasibility of the PDN can be determined (310). For example, for each library element in the net, the product of the current consumption amount ($I_n$) and the current consumption to maximum current carrying capacity ratio ($\beta n$) can be determined and compared to the maximum current carrying capacity ($I_{MAX}$). If the following equation is found to be true for any of the library elements, then the PDN can be deemed unfeasible:

$$I_{MAX} < I_n * \beta_n. \quad (3)$$

That is, if the maximum current carrying capacity ($I_{MAX}$) determined at process 304 is less than the product of the current consumption amount determined for any one of the library elements at process 306 and the value of $\beta$ determined for that library element at process 308, a determination can be made that the PDN, as currently designed, is not feasible or, more particularly, that it can not accommodate all the library elements incorporated into the IC design. Thus, power planning at process 106 of FIG. 1 must be repeated before defining any protected zones around any of the library elements (312). However, if the equation (4) is found to be false, then the PDN can be deemed feasible. That is, if the maximum current carrying capacity ($I_{MAX}$) determined at process 304 is greater than or equal to the product of the current consumption amount and the value of $\beta$ for all of the library elements, a determination can be made that the PDN, as currently designed, is feasible or, more particularly, that it can accommodate all the library elements incorporated into the IC design. It should be noted that, alternatively, any other suitable test for feasibility could be used at process 310. For example, the test for feasibility could be whether or not the current consumption to maximum current carrying capacity ratio ($\beta n$) for any of the library elements is greater than 1. In this case, the PDN could be deemed unfeasible, if the value of $\beta$ for any of the library elements is greater than 1, and unfeasible, if the value of $\beta$ for all of the library elements is less than 1.

Once it is determined that the PDN is feasible, the next step in the process is determining which library elements require a protected zone. That is, for each specific library element, the current consumption to maximum current carrying capacity ratio ($\beta_n$) is compared to some predetermined threshold ratio ($\beta_T$) to determine if it is less than or equal to that predetermined threshold ratio ($\beta_T$) (314). The value of the current consumption to maximum current carrying capacity ratio ($\beta_n$) for each library element in a feasible PDN can theoretically range from 0 to 1. The value of the predetermined threshold ratio ($\beta_T$) can be some number nearer to 0 than 1 (e.g., 0.05, 0.1, 0.2, etc.). When the current consumption to maximum current carrying capacity ratio ($\beta_n$) of a specific library element is less than or equal to this predetermined threshold ratio ($\beta_T$), no protected zone is placed around the specific library element (316). When the current consumption to maximum current carrying capacity ratio ($\beta_n$) is greater than the predetermined threshold ratio ($\beta_T$), a protected zone is placed around the specific library element (318).

It should be noted that the size of that protected zone around a specific library element can depend upon the actual value of current consumption to maximum current carrying capacity ratio ($\beta_n$) for that library element, according to rules set forth, for example, in the library element placement rule deck. Thus, a first library element with relatively large current consumption to maximum current carrying capacity ratio ($\beta_1$), which is indicative of a relatively high current consumption amount ($I_1$), will have a larger protected zone than a second library element with a relatively small current consumption to maximum current carrying capacity ratio ($\beta_2$), which is indicative of a relatively low current consumption amount ($\beta_2$). As discussed in greater detail below with regard to placement of the library elements at process 112 of FIG. 1, the library element placement rule deck can define the relationship between the value of the current consumption to maximum current carrying capacity ratio ($\beta_n$) assigned to each library element and the size of a protected zone placed around that library element (i.e., can specify the size limits of the protected zone). For example, the library element placement rule deck can state that the protected zone around a library element should extend from the outer boundaries of that library element toward the next closest power rails in all directions (i.e., in the x, y and, if applicable, z directions) and that the portion of the area between the outer boundaries of the library element and the next closest power rails covered by the protected zone will be equal to the value of the current consumption to maximum current carrying capacity ratio ($\beta_n$) for that library element. That is, if the current consumption to maximum current carrying capacity ratio ($\beta_1$) for the first library element is 1, then the protected zone for that first library element would extend the full distance between the outer boundaries of the first library element and the next closest power rails; whereas if the current consumption to maximum current carrying capacity ratio ($\beta_2$) for the second element is only 0.5, then the protected zone for that second library element would only extend half the distance between the outer boundaries of the second library element and the next closest power rails; and so on. See more detailed discussion below with regard to placement of the library elements at process 112 of FIG. 1.

Referring again to the flow diagram of FIG. 1, once the protected zones are defined around one or more of the library elements at process 110, placement of the library elements relative to the power rails (e.g., to the alternating VDD and VSS wires shown in FIG. 2) in the previously designed PDN for the IC can be established (112). Specifically, library element placement refers to the process of deciding the specific locations on the IC chip and, particularly, within the area(s) designated for library elements during floorplanning, wherein each of the library elements will be placed. In the methods disclosed herein, the placement process can specifically be an EM-aware placement process. More particularly, the placement process can be performed such that each library element requiring a protected zone, as determined at process 318 of FIG. 3, is surrounded by such a protected zone, the size of which is defined (e.g., by the library element placement rule) based on the value of the current consumption to maximum current carrying capacity ratio ($\beta_n$) for that library element. The placement process is further performed such that each library element is prevented from being placed in a protected zone around any other library element, thereby avoiding EM fails in the power deliver network.

Figure 4A:
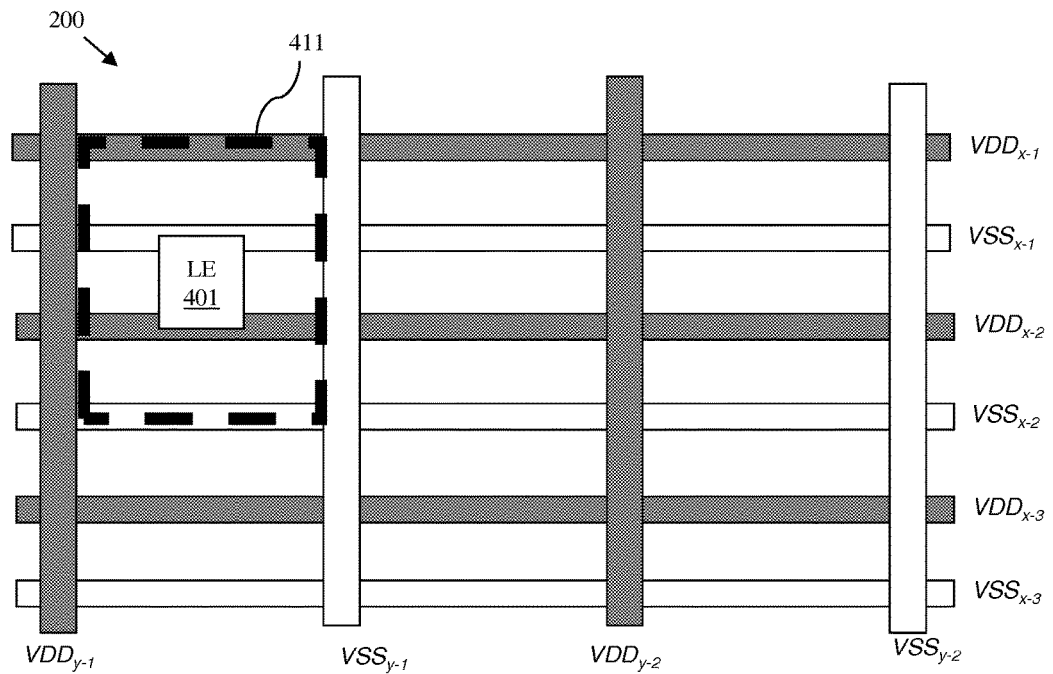
FIGS. 4A-4E illustrate placement of five different library elements in sequence relative to the same power delivery network (PDN)
Figure 4B:
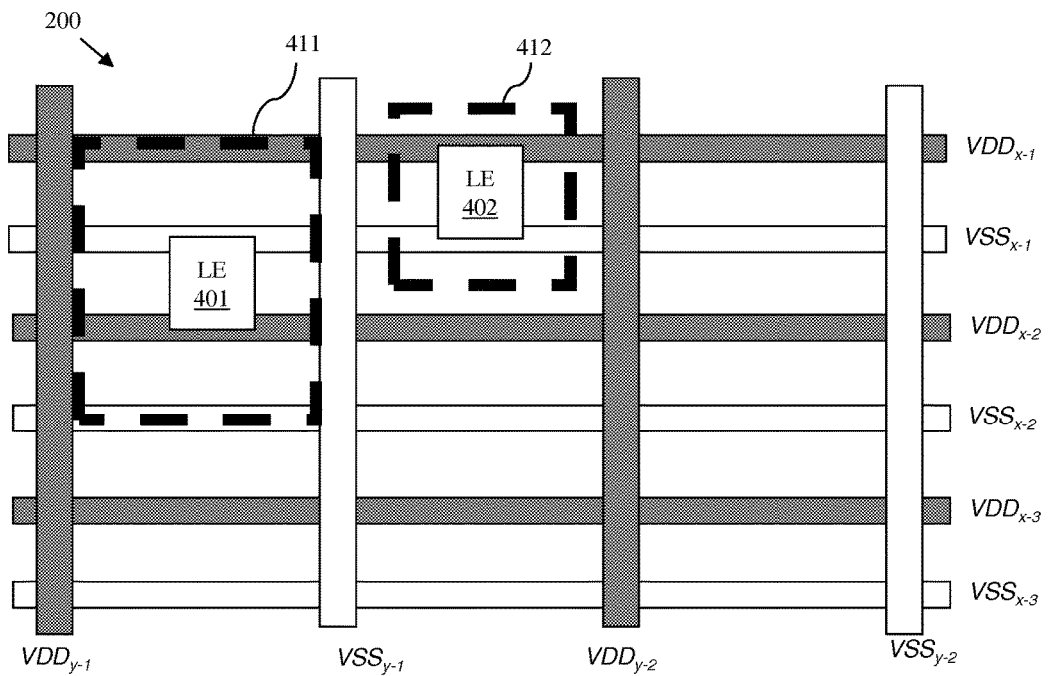
Figure 4C:
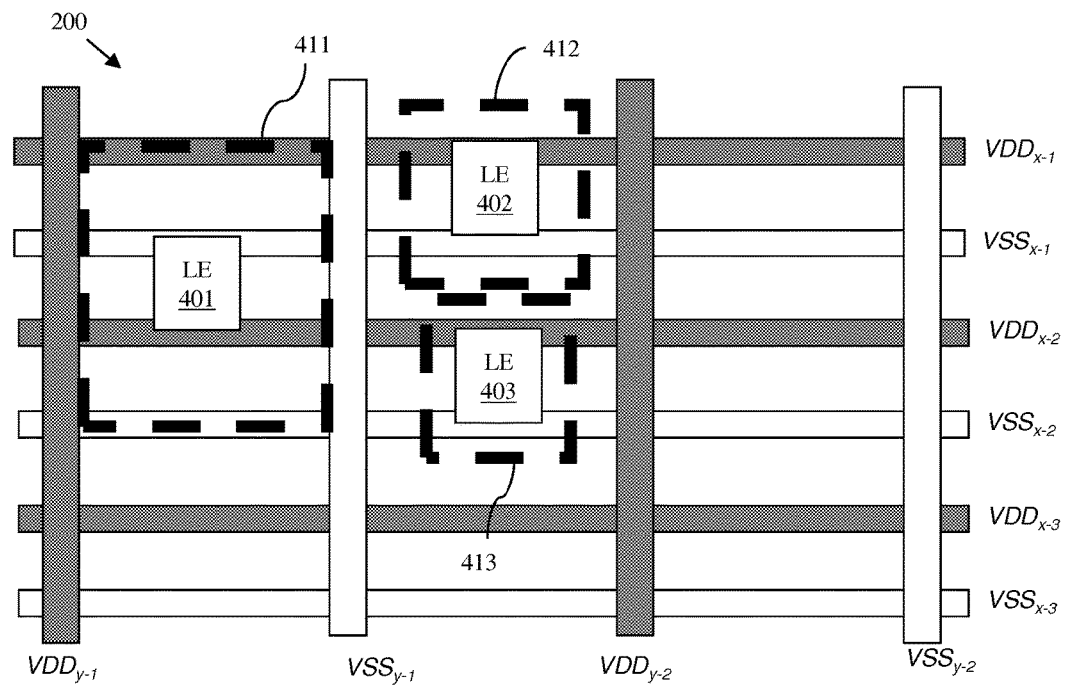
Figure 4D:
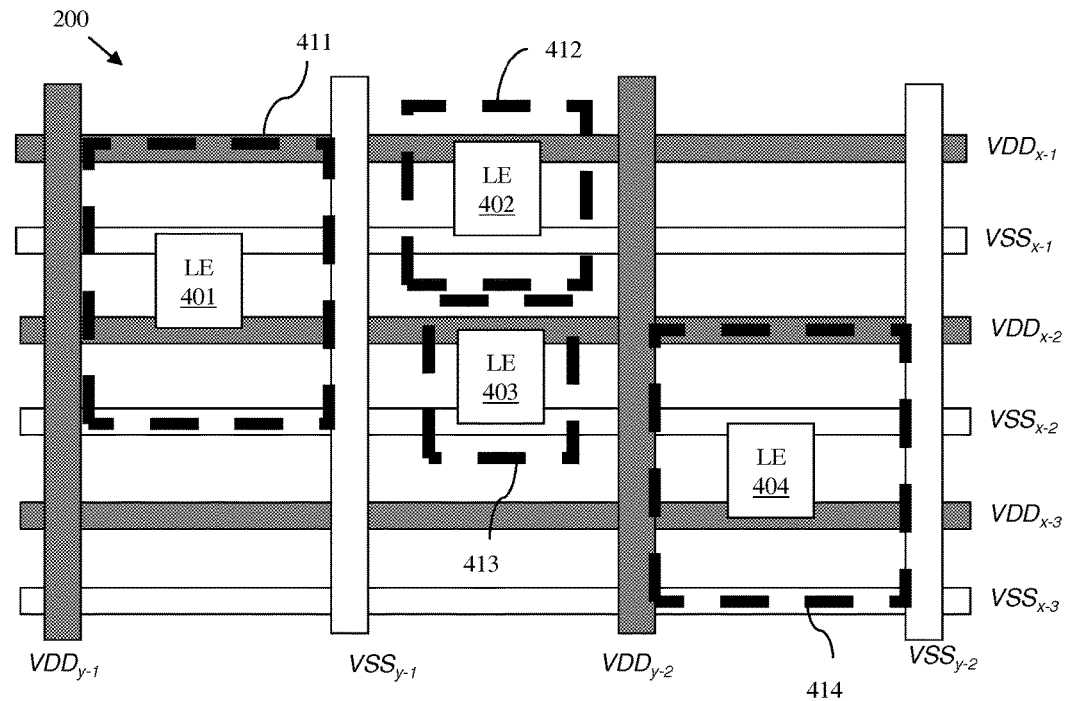
Figure 4E:
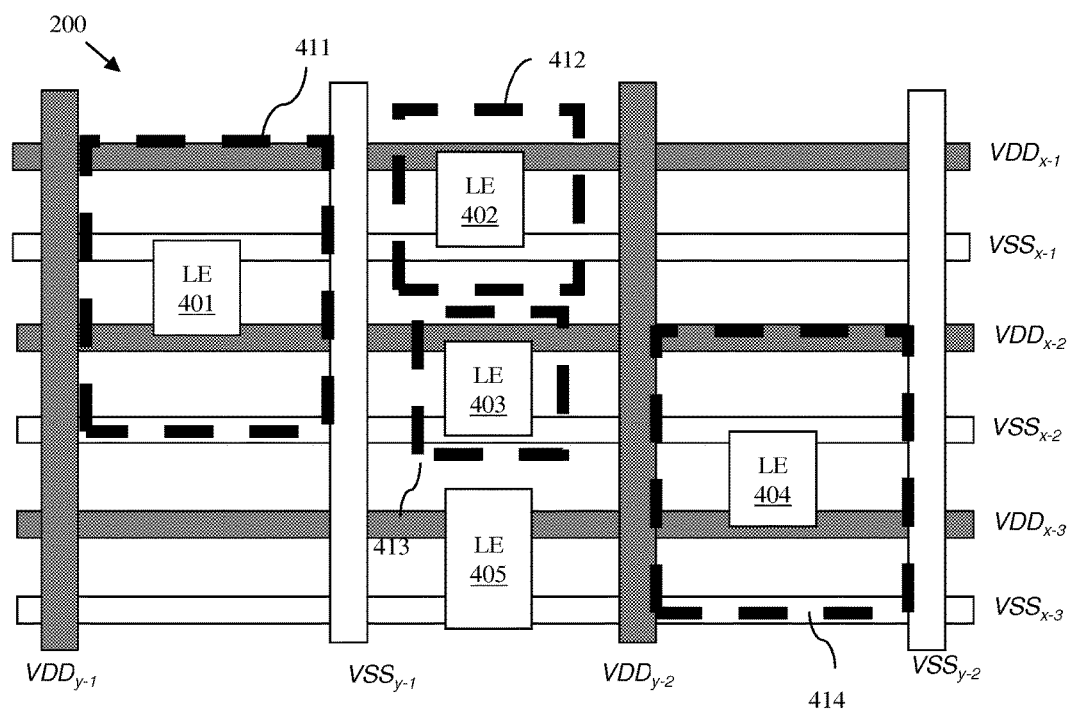

For example, FIGS. 4A-4E illustrate placement of various library elements 401-405 in sequence relative to the PDN 200. For purposes of illustration, it is assumed that the library element placement rule deck states that the protected zone around a library element should extend from the outer boundaries of that library element toward the next closest power rails in all directions (e.g., the x, y and, if applicable, z) directions and that the portion of the area between the outer boundaries of the library element and the next closest power rails covered by the protected zone will be equal to the value of the current consumption to maximum current carrying capacity ratio ($\beta_n$) for that library element, as discussed above. In this case, if prior to placement a protected zone 411 is defined around a first library element 401 having an current consumption to maximum current carrying capacity ratio ($\beta_1$) of 1, then, during placement, the first library element 401 can be placed such that it is connected to the ground power rail $VSS_{x-1}$ and the adjacent positive power supply power rail $VDD_{x-2}$ and positioned between the ground power rail $VSS_{y-1}$ and the adjacent positive power supply power rail $VDD_{y-1}$. Since the current consumption to maximum current carrying capacity ratio ($\beta_1$) is 1, the protected zone 411 will extend to the next closest power rails on all sides (i.e., to $VDD_{x-1}$, $VSS_{x-2}$, $VDD_{y-1}$ and $VSS_{y-1}$), as shown in FIG. 4A. If prior to placement a protected zone 412 is defined around a second library element 402 having a current consumption to maximum current carrying capacity ratio ($\beta_2$) of 0.5, then, during placement, the second library element 402 can be placed such that it is connected to the ground power rail $VSS_{x-1}$ and the adjacent positive power supply power rail $VDD_{x-1}$ and between the ground power rail $VSS_{y-1}$ and the adjacent positive power supply power rail $VDD_{y-2}$ Since the current consumption to maximum current carrying capacity ratio ($\beta_2$) is 0.5, the protected zone 412 will extend halfway to the next closest power rails on all sides (i.e., halfway to $VDD_{x-2}$, $VDD_{y-2}$ and $VSS_{y-1}$) without overlapping the protected zone 411, as shown in FIG. 4B. If prior to placement a protected zone 413 is defined around a third library element 403 having an current consumption to maximum current carrying capacity ratio ($\beta_3$) of 0.33, then, during placement, the third library element 403 can be placed such that it is connected to the ground power rail $VSS_{x-2}$ and the adjacent positive power supply power rail $VDD_{x-2}$ and between the ground power rail $VSS_{y-1}$ and the adjacent positive power supply power rail $VDD_{y-2}$ Since the current consumption to maximum current carrying capacity ratio ($\beta_3$) is 0.33, the protected zone 413 will extend one third of the way to the next closest power rails on all sides (i.e., one third of the way to $VDD_{x-3}$, $VSS_{x-1}$, $VDD_{y-2}$ and $VSS_{y-1}$) without overlapping the protected zones 411 and 412, as shown in FIG. 4C. If prior to placement a protected zone 414 is defined around a fourth library element 404 having a current consumption to maximum current carrying capacity ratio ($\beta_4$) of 1, then, during placement, the fourth library element 404 can be placed such that it is connected to the ground power rail $VSS_{x-2}$ and the adjacent positive power supply power rail $VDD_{x-3}$ and between the ground power rail $VSS_{y-2}$ and the adjacent positive power supply power rail $VDD_{y-2}$ Since the current consumption to maximum current carrying capacity ratio ($\beta_3$) is 1, the protected zone 414 will extend the full distance to the next closest power rails on all sides (i.e., to $VDD_{x-2}$, $VSS_{x-3}$, $VDD_{y-2}$ and $VSS_{y-2}$) and will not overlap the protected zones 411-413, as shown in FIG. 4D. If prior to placement no protected zone is defined around a fifth library element 405, then, during placement, that fifth library element 405 can be placed anywhere that it does not overlap the protected zones 411-414. For example, it can be paced such that it is connected to the ground power rail $VSS_{x-3}$ and the adjacent positive power supply power rail $VDD_{x-3}$ and between the ground power rail $VSS_{y-1}$ and the adjacent positive power supply power rail $VDD_{y-2}$, as shown in FIG. 4E.

It should be noted that, while the design rules in the method are described above with respect to forming protected zones around individual library elements, additional embodiments of the method can provide for additional design rules that can be used to define additional protective zones around groups of library element. For example, when a group of two or more library elements are placed near each other because none of the library elements is surrounded by a protected zone and when the combined current consumptions amount of all of the library elements in the group is greater than or equal to a calculated threshold, an additional protective zone may be defined around the group.

It also should be noted that in addition to establishing the placement of the library elements at process 112 so as to avoid EM fails in the PDN, this placement process can be performed such that placement of the library elements is timing optimized. That is, the library files can, as discussed above, contain timing information for the library elements and the library elements can be placed at process 112 considering this timing information to avoid violation of any timing requirements in the IC. Techniques for performing timing optimized library element placement are well known in the art and, thus, the details of this particular aspect of the placement process are omitted from the specification in order to allow the reader to focus on the salient aspects of the disclosed methods.

Following library element placement at process 112, clock planning for the IC can be performed (114). That is, a clock distribution network (CDN) (e.g., a clock tree) can be synthesized at process 114. A CDN is a network of wires and clock cells that distribute clock signals to all of the clocked elements in the IC and a CDN can be synthesized, for example, according to a clock planning rule deck. This CDN synthesizing process can, optionally, also be an EM-aware process. That is, the CDN synthesizing process can be performed using essentially the same variables as discussed above with regard to defining protected zones around library elements in order to similarly avoid additional EM fails in the CDN. That is, the current in each CDN net can be determined and protected zones can be defined around some or all of the library elements of CDN.

After the CDN is synthesized, a wire routing process can be performed (116). Specifically, wires that electrically connect the different library elements and, if applicable, any customized functional blocks in the IC can be added to the design layout given the placement of the different library elements, etc. Wire routing can, for example, be performed according to a wire routing rule deck. This addition of the connecting wires essentially completes the design layout.

Once the design layout is completed, various verification processes can be performed. For example, a timing and signal integrity verification process can be performed (118). That is, timing and signal integrity analyses can be performed on the design layout in order to determine-whether it meets various timing specifications and whether all functional and delay violations due to noise are eliminated. If the design layout fails to meet predetermined timing and signal integrity verification requirements, the design must be reworked starting back at process 104 with floorplanning (120). A physical verification process can also be performed (122). That is, the design layout can be checked to see whether it meets design rules, whether it is consistent with the original schematic (i.e., whether it passes a layout versus schematic (LVS) check), etc. If the design layout fails to meet predetermined physical verification requirements, the design must be reworked again starting back at process 104 with floorplanning (124). An electromigration fails and voltage drop (also referred to in the art as IR drop) verification process can also be performed (126). Although various processes performed during the design flow, as discussed above (e.g., library element placement at process 112 and clock distribution network synthesis at process 114) are EM-aware, this verification process should be performed to confirm that EM fails will be avoided. As mentioned above, EM is generally understood to be the movement of metal ions due to an electric field. This movement of metal ions can cause voids within and/or shorts between the wires and vias that make up the various interconnect networks, including the power delivery network (also referred to as the power bus) and the clock distribution network (also referred to as the clock tree), on an IC. IR drop refers to a voltage drop across an interconnect network (e.g., a PDN or CDN), which is due to resistance and inductance, and which can result in slower switching speeds and lower noise margins and, thereby result in functional failures. Testing for EM fails and/or unacceptable IR drops can be performed, for example, through simulation. If the design layout fails to meet predetermined EM and IR drop verification requirements, the design rules (e.g., the library element placement rule deck) used to define the protected zones can be adjusted and the design can be reworked, starting with redesigning the PDN at process 106 (128)-(130). For example, at process 128, the factors used to determine the values of the library element-specific current consumption to maximum current carrying capacity ratios, which are used determine whether to place a protected zone around a given library element and also the size of that protected zone, can be adjusted.

Once the design layout passes all of the above described verification processes, the final IC design layout can be generated, stored in memory and IC chips can be manufactured according to the final IC design layout (132).

Figure 5:
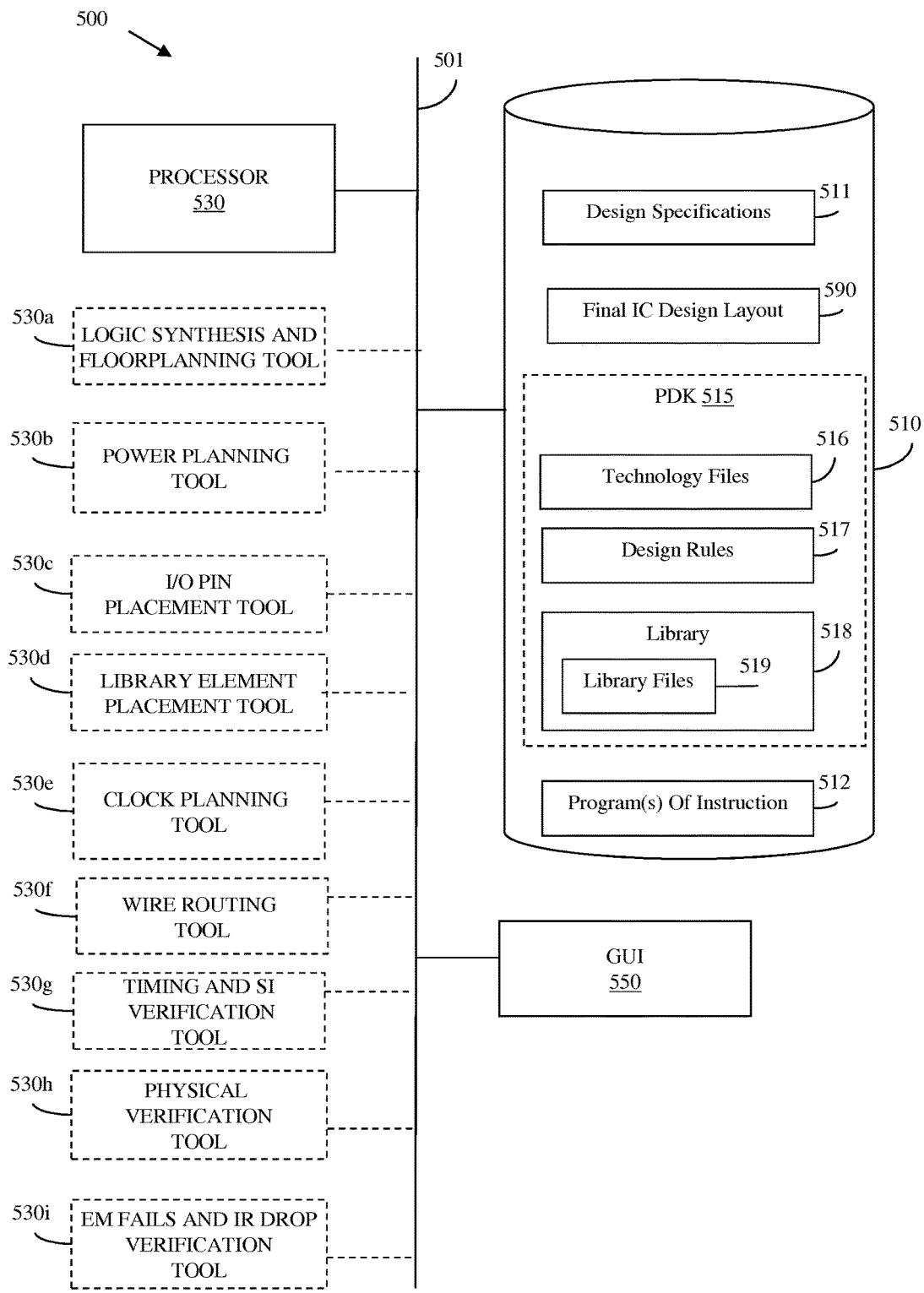
FIG. 5 is a schematic diagram illustrating an electromigration (EM)-aware integrated circuit (IC) design system; and, FIG. 6 is a schematic diagram illustrating a representative hardware environment for implementing the disclosed design methods, systems and computer program products.

Referring to FIG. 5, also disclosed herein are electromigration (EM)-aware integrated circuit (IC) design systems 500. Each design system 500 can be a computer-aided design (CAD) system and, specifically, can incorporate at least one memory 510 (e.g., at least one computer readable storage medium, such as a computer readable storage device), a user interface 550 (e.g., a graphic user interface (GUI)) and at least one processor (e.g., 530 or 530a-i, see detailed discussion below). Components of the design system 500, including the processor(s), memory(ies) and GUI, can be interconnected over a system bus 501, as illustrated. Alternatively, any one or more of the components of the system 500 can communicate with any other component over a wired or wireless network.

The memory 510 can store program(s) 512 of instruction (e.g., electronic design automation (EDA) tool(s)) for performing the various design processes described in detail below. The memory 510 can further store design information, for example, in the form of a process design kit (PDK) 515. This design information (e.g., the PDK 515) can include a set of foundry-specific files including, but not limited to, technology files 516 for a specific technology node, a library element library 518, design rules 517, etc., as discussed in detail above with regard to the method.

As mentioned above, the design system 500 can incorporate at least one processor. Specifically, the design system 500 can incorporate a single specialized processor 530 (e.g., a single specialized computer processing unit) that, during IC design, performs (i.e., that is adapted to perform, that is configured to perform and/or that executes program(s) 512 of instructions to perform) multiple process steps, as described in detail below. Alternatively, the design system 500 can incorporate multiple specialized processors 530a-i (e.g., multiple different specialized computer processing units) and, during IC design, each processor can perform (i.e., can be adapted to perform, can be configured to perform and/or can execute one or more specific programs 512 of instructions to perform) one or more of the multiple process steps, as described in detail below. For purposes of illustration, nine different special purpose processor(s) referred to as tools are shown in FIG. 5 including a logic synthesis and floorplanning tool 530a, a power planning tool 530b, a I/O pin placement tool 530c, a library element placement tool 530d, a clock planning tool 530e, a wiring routing tool 530f, a timing and signal integrity verification tool 530g, a physical verification tool 530h and an electromigration fails and voltage drop (also referred to in the art as IR drop) verification tool 530i. It should be understood that FIG. 5 is not intended to be limiting and, alternatively, the multiple process steps, as described in detail below, can be performed by any number of one or more processors.

The design system 500 can receive (e.g., can be adapted to receive, can be configured to receive, etc.) design inputs for an IC in a specific technology node (e.g., design specifications 511). These design inputs can be received, for example, from a designer via the graphic user interface (GUI) 550. Using the GUI 550, the designer can develop an initial design for the IC. This initial design can be represented by a high-level description, which sets out the requirements for the IC chip. This high-level description can be stored in the memory 510 in, for example, a hardware description language (HDL), such as VHDL or Verilog. Those skilled in the art will recognize that this high-level description will set out specifications for various parameters (e.g., for channel length, channel width, doping, spacer width, etc.).

The processor 530 (or, if applicable, one or more of the processors 530(a)-(i)) can access and use (i.e., can be adapted to access and use, can be configured to access and use, can execute program(s) 512 of instructions to access and use, etc.) the technology files 516, the design specifications 511 and the library files 519 early in the design process in order to, in a timely manner, generate and store in memory 510 a final IC design layout 590 that can be used to manufacture IC chips with minimal EM fails for improved IC reliability.

Specifically, the processor 530 (or, if applicable, the logic synthesis and floorplanning tool) can perform (i.e., can be adapted to perform, can be configured to perform, can execute a program of instructions 512 to perform, etc.) logic synthesis and floorplanning. During logic synthesis, the high-level description can be synthesized into a gate-level netlist, which describes the connectivity of the IC in terms of nets. In library element-based design, the high-level description can be synthesized into the netlist using library elements selected from the library element library. During floorplanning, the size of the IC chip, the placement of customized functional blocks, the placement of the area(s) for library elements, etc. can be determined.

The processor 530 (or, if applicable, the power planning tool 530b) can perform (i.e., can be adapted to perform, can be configured to perform, can execute a program of instructions 512 to perform, etc.) power planning for the IC. Specifically, during power planning, the power requirements for the IC can be estimated (e.g., based on the design specifications) and a power delivery network (PDN) (also referred herein as a power bus or grid) can be designed for the IC based on the power requirements and the floorplan. Such power planning can be performed based on power-relevant information including, but not limited to, the temperature and voltage use conditions indicated for the IC, the specific library elements (i.e., the specific library elements selected for the IC, and the switching frequency of each net in the IC. This power-relevant information can be used to determine the amount of current in each net (i.e., the amount of power required for each net to operate). Once the amount of power required for each net is determined, the PDN can be created so that it is configured to deliver to each net the amount of power required for that net to operate. Such power planning can, for example, be performed according to a power planning rule deck. Techniques for power planning are well known in the art. Thus, the details of the power planning process are omitted from this specification in order to allow the reader to focus on the salient aspects of the disclosed method. In any case, FIG. 2 illustrates a portion of an exemplary power grid 200, which is designed at process 106 and which incorporates multiple power rails comprising alternating positive supply voltage and ground power rails (i.e. alternating VDD and VSS wires) running in the x-direction and overlaid by alternating positive supply voltage and ground power rails (i.e., alternating VDD and VSS wires) running in the y-direction.

The processor 530 (or, if applicable, the input/output pin placement tool 530c) can perform (i.e., can be adapted to perform, can be configured to perform, can execute a program of instructions 512 to perform, etc.) input/output (I/O) pin placement. Specifically, the I/O pads and buffers can be placed based on the floorplan and the design of the PDN. Such I/O pin placement can, for example, be performed according an I/O pin placement rule deck. Techniques for I/O pin placement are well known in the art and, thus, the details of the I/O pin placement process are omitted from this specification in order to allow the reader to focus on the salient aspects of the disclosed system.

Next, the processor 530 (or, if applicable, the library element placement tool 530d) can acquire (i.e., can be adapted to acquire, can be configured to acquire, can execute a program of instructions 512 to acquire, etc.) information that impacts EM (i.e., EM-relevant information). The processor 530 (or, if applicable, the library element placement tool 530d) can use (i.e., can be adapted to use, can be configured to use, can execute a program of instructions 512 to use, etc.) that EM-relevant information to determine whether the design and, particularly, the PDN is feasible and, if so, to define protected zones (also referred to herein as keepout zones) around at least some of the library elements in the design. For purposes of this disclosure, a feasible PDN is one in which the maximum current carrying capacity of the power rails in the PDN is sufficient to accommodate current carrying amounts of the library elements that are to be incorporated into the design, as discussed in greater detail below. If it is determined that the PDN is not feasible, then power planning must be repeated. If the PDN is determined to be feasible, then protected zones can be defined by the processor according to design rules (e.g., as set forth in a library element placement rule deck), which indicate when a library element should be surrounded by a protected zone and which further indicate how the size of the protected zone should be limited.

Specifically, the processor 530 (or, if applicable, the library element placement tool 530d) can select a net in the design can be selected and, for that net, determine values for multiple variables that impact EM in the PDN. The values for the variables can be acquired directly and/or indirectly using the technology files, the design specifications and the library files. These variables can include, but are not limited to the following: an electromigration (EM) current limit for the net, an activity factor (AF), a switching frequency (F), a voltage (V) and an overlap capacitance ($C_{ov}$) for the net; a leakage power amount for the net; a dynamic power amount for the net; a total power (P) amount for the net; and a maximum current carrying capacity ($I_{MAX}$) for the power rails in the PDN supplying power to the net. As discussed in detail above with regard to the method, the EM current limit for the net can be determined, for example, based on Black's equation and using both generic metal information (e.g., wire width, wire thickness, and wire length) acquired from the technology file and specific metal information associated with the net (e.g., the amount of wire in the net) from the design specifications. The activity factor (AF), switching frequency (F), and voltage (V) values for the net can each be acquired from the design specifications. The leakage power amount for the net can be determined, for example, based on FETWIDTH amounts for the various different VT-type transistors in the net and leakage models for the different VT-type transistors acquired from the library files. The dynamic power (also referred to herein as the active power) for the net can be determined based on the previously determined values for the AF, F, V and $C_{ov}$, using equation (1). The total power (P) for the net can be calculated as the sum of leakage power and the dynamic power at the maximum temperature and voltage allowed for that net, as used within the IC. The maximum current carrying capacity ($I_{MAX}$) of the power rails in the portion of the PDN associated with the net can be defined using the previously determined EM current limit. As discussed, the maximum current carrying capacity ($I_{MAX}$) can be defined so that it equal to the EM current limit. Alternatively, the maximum current carrying capacity ($I_{MAX}$) can be defined pessimistically. For example, the maximum current carrying capacity ($I_{MAX}$ can be defined so that it has a smaller value than the EM current limit and, particularly, so that its value is some percentage (e.g., 95%, 90%, 85%, etc.) of the EM current limit.

The processor 530 (or, if applicable, the library element placement tool 530d) can further determine (i.e., be adapted to determine, be configured to determine, execute a program of instructions 512 to determine, etc.) current consumption amounts (i.e., $I_1, I_2, I_3, \ldots I_n$) for each of the library elements in the net based on the previously determined total power of the net at the maximum temperature and voltage. That is, a specific current consumption amount can be determined for each specific library element in the net. Those skilled in the art will recognizes that each current consumptions amount for each of the specific library element can be determined by solving equation (2) above.

Additionally, the processor 530 (or, if applicable, the library element placement tool 530d) can determine (i.e., be adapted to determine, be configured to determine, execute a program of instructions 512 to determine, etc.) current consumption to maximum current carrying capacity ratios (i.e., β1, β2, β3, ... βn) for each of the library elements in the net. Specifically, for each library element, the ratio (i.e., β1, β2, β3, ... βn) of the previously determined consumption amount for that library element (i.e., $I_1, I_2, I_3, \ldots I_n$) to the maximum current carrying capacity ($I_{MAX}$) can be determined. As discussed above, the value of β will be relatively low for library elements with low current consuming amounts and relatively high for library elements with high current consuming amounts.

The processor 530 (or, if applicable, the library element placement tool 530d) can further determine (i.e., be adapted to determine, be configured to determine, execute a program of instructions 515 to determine, etc.) the feasibility of the PDN. Specifically, for each library element in the net, the product of the current consumption amount ($I_n$) and the value of βn can be determined and compared to the previously determined maximum current carrying capacity ($I_{MAX}$). If the following equation (3) is found to be true for any of the library elements, then the PDN can be deemed unfeasible. Thus, power planning must be repeated before defining any protected zones around any of the library elements. However, if equation (3) is found to be false, then the PDN can be deemed feasible. Once it is determined that the PDN is feasible, the processor 530 (or, if applicable, the library element placement tool 530d) can determine (i.e., be adapted to determine, be configured to determine, execute a program of instructions 515 to determine, etc.) which library elements require a protected zone. Specifically, for each specific library element, the current consumption to maximum current carrying capacity ratio ($β_n$) can be compared to some predetermined threshold ratio ($β_T$) to determine if it is less than or equal to that predetermined threshold ratio ($β_T$). As mentioned above, the value of the current consumption to maximum current carrying capacity ratio ($β_n$) for each library element in a feasible PDN can theoretically range from 0 to 1. The value of the predetermined threshold ratio ($β_T$) can be some number nearer to 0 than 1 (e.g., 0.05, 0.1, 0.2, etc.). When the current consumption to maximum current carrying capacity ratio ($β_n$) of a specific library element is less than or equal to this predetermined threshold ratio ($β_T$), no protected zone is placed around the specific library element. When the current consumption to maximum current carrying capacity ratios ($β_n$) of a specific library element is greater than the predetermined threshold ratio ($β_T$), a protected zone is placed around the specific library element.

It should be noted that the size of that protected zone around a specific library element can depend upon the actual value of current consumption to maximum current carrying capacity ratio ($β_n$) for that library element, according to rules set forth, for example, in the library element placement rule deck. Thus, a first library element with relatively large current consumption to maximum current carrying capacity ratio ($β_1$), which is indicative of a relatively high current consumption amount ($I_1$), will have a larger protected zone than a second library element with a relatively small current consumption to maximum current carrying capacity ratio ($β_2$), which is indicative of a relatively low current consumption amount ($I_2$). It should be noted that the library element placement rule deck can define the relationship between the value of the current consumption to maximum current carrying capacity ratio ($β_n$) assigned to each library element and the size of a protected zone placed around that library element (i.e., can specify the size limits of the protected zone). For example, the library element placement rule deck can state that the protected zone around a library element should extend from the outer boundaries of that library element toward the next closest power rails in all directions (i.e., in the x, y and, if applicable, z directions) and that the portion of the area between the outer boundaries of the library element and the next closest power rails covered by the protected zone will be equal to the value of the current consumption to maximum current carrying capacity ratio ($β_n$) for that library element. That is, if the current consumption to maximum current carrying capacity ratio ($β_1$) for the first library element is 1, then the protected zone for that first library element would extend the full distance between the outer boundaries of the first library element and the next closest power rails; whereas if the current consumption to maximum current carrying capacity ratio ($β_2$) for the second element is only 0.5, then the protected zone for that second library element would only extend half the distance between the outer boundaries of the second library element and the next closest power rails; and so on.

The processor 530 (or, if applicable, the library element placement tool 530d) can further establish placement (e.g., can be adapted to establish placement, can be configured to establish placement, can execute a program of instructions 512 to establish placement, etc.) of the library elements relative to the power rails (e.g., to the alternating VDD and VSS wires shown in FIG. 2) in the previously designed PDN for the IC. This placement process can specifically be an EM-aware placement process and, more particularly, can be performed such that each library element is prevented from being placed in a protected zone around any other library element, thereby avoiding EM fails in the power deliver network, as discussed in detail above with regard to the method and illustrated in FIGS. 4A-4E.

It should be noted that, while the design rules in the system 500 are described above with respect to forming protected zones around individual library elements, additional embodiments of the system can provide for additional design rules that can be used to define additional protective zones around groups of library element. For example, when a group of two or more library elements are placed near each other because none of the library elements is surrounded by a protected zone and when the combined current consumptions amount of all of the library elements in the group is greater than or equal to a calculated threshold, an additional protective zone may be defined by the processor 530 (or, if applicable, by the library element placement tool 530*d*) around the group.

It should also be noted that in addition to establishing the placement of the library elements so as to avoid EM fails in the PDN, the processor 530 (or, if applicable, the library element placement tool 530*d*) can perform this placement process such that placement of the library elements is timing optimized. That is, the library files can, as discussed above, contain timing information for the library elements and the library elements can be placed considering this timing information to avoid violation of any timing requirements in the IC. Techniques for performing timing optimized library element placement are well known in the art and, thus, the details of this particular aspect of the placement process are omitted from the specification in order to allow the reader to focus on the salient aspects of the disclosed system.

The processor 530 (or, if applicable, the clock planning tool 530*e*) can perform (i.e., can be adapted to perform, can be configured to perform, can execute a program of instructions 512 to perform, etc.) clock planning for the IC. That is, a clock distribution network (CDN) (e.g., a clock tree) can be synthesized and this CDN synthesizing process can, optionally, be an EM-aware process. That is, as discussed in detail above with regard to the method, this CDN synthesizing process can be performed using essentially the same variables discussed above with regard to defining protected zones around library elements in order to similarly avoid additional EM fails in the CDN.

The processor 530 (or, if applicable, the wire routing tool 530*f*) can perform (i.e., can be adapted to perform, can be configured to perform, can execute a program of instructions 512 to perform, etc.) a wire routing process. Specifically, wires that electrically connect the different library elements in the IC can be added to the design layout given the placement of those different library elements. Wire routing can, for example, be performed according to a wire routing rule deck. This addition of the connecting wires essentially completes the design layout.

The processor 530 (or, if applicable, the wire routing tool 530*f*) can perform (i.e., can be adapted to perform, can be configured to perform, can execute a program of instructions 512 to perform, etc.) a wire routing process. Specifically, wires that electrically connect the different library elements and, if applicable, customized functional blocks in the IC can be added to the design layout given the placement of those different library elements, etc. Wire routing can, for example, be performed according to a wire routing rule deck. This addition of the connecting wires essentially completes the design layout.

The processor 530 (or, if applicable, verification tools 530*g*-530*i*) can perform (i.e., can be adapted to perform, can be configured to perform, can execute a program of instructions 512 to perform, etc.) various verification processes. For example, the processor 530 (or, if applicable the timing and signal integrity verification tool 530*g*) can perform timing and signal integrity analyses on the design layout in order to determined whether the design layout meets various timing specifications and whether all functional and delay violations due to noise are eliminated. If the design layout fails to meet predetermined timing and signal integrity verification requirements, the design must be reworked starting with floorplanning. The processor 530 (or, if applicable, the physical verification process tool 530*h*) can check the design layout to see whether it meets design rules, whether it is consistent with the original schematic (i.e., whether it passes a layout versus schematic (LVS) check), etc. If the design layout fails to meet predetermined physical verification requirements, the design must be reworked again starting with floorplanning.

The processor 530 (or, if applicable, the EM fails and IR drop verification tool 530*i*) can test EM fails and IR drops across the network (e.g., through simulations). If the design layout fails to meet predetermined EM and IR drop verification requirements, the design rules used to define the protected zones can be adjusted. For example, the factors used to determine the values of the library element-specific current consumption to maximum current carrying capacity ratios, which are used to determine whether to place a protected zone around a given library element as well as the size of that protected zone, can be adjusted. Then, the design can be reworked starting with redesigning the PDN.

Once the design layout passes all of the above described verification processes, the processor 530 can generate the final IC design layout 590 and store in memory so that IC chips can be manufactured according to the final IC design layout 590.

Also disclosed herein is a computer program product for electromigration (EM)-aware integrated circuit (IC) design. The computer program product can be a computer readable storage medium with program instructions embodied therewith (e.g., stored thereon). These program instructions can be executable by a processor to cause the processor to perform the above-described integrated circuit design method. More specifically, the present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may incorporate copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which has one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
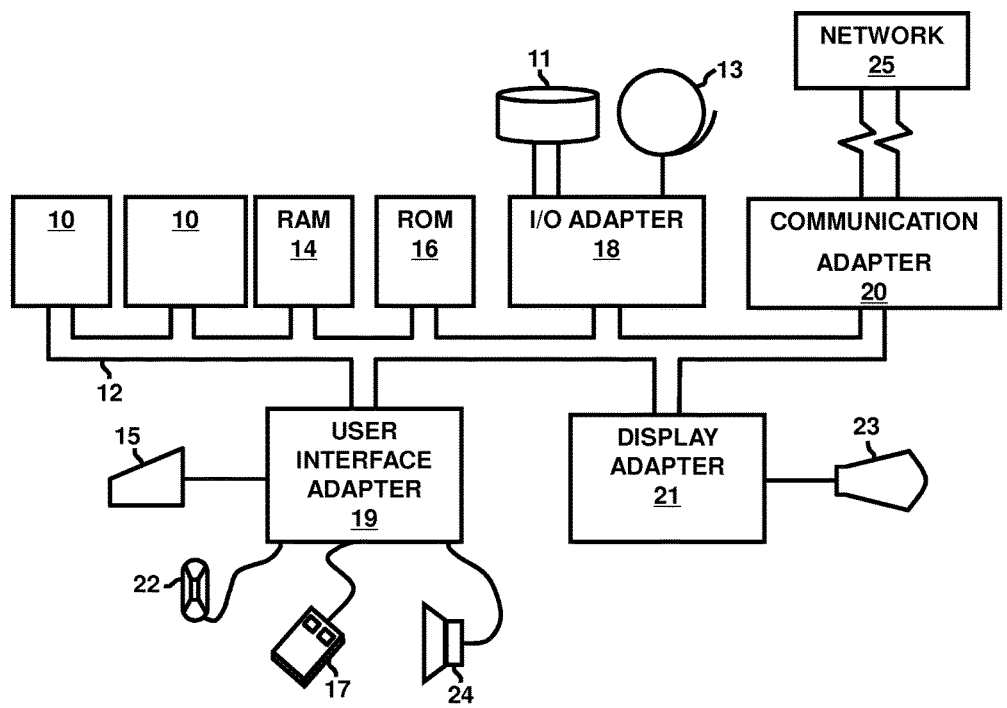

A representative hardware environment (i.e., a computer system) for implementing the design methods, systems and computer program products is depicted in FIG. 6. This schematic drawing illustrates a hardware configuration of an information handling/computer system in accordance with the embodiments herein. The system has at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed design methods, systems and computer program products and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are electromigration (EM)-aware integrated circuit (IC) design methods, systems and computer program products, which consider EM early in the IC design process in order to generate, in a timely manner, an IC design that can be used to manufacture IC chips that will exhibit minimal EM fails for improved IC reliability. Specifically, prior to placement of library elements in the design, EM-relevant information can be acquired and used to define protected zones around at least some of the library elements. Once the protected zones are defined, the library elements can be placed relative to power rails in a previously designed power delivery network for the IC and this placement process can be performed such that each library element is prevented from being placed in a protected zone around any other library element in order to avoid EM fails in the power deliver network. Optionally, this same EM-relevant information can be used during subsequent synthesis of a clock distribution network to prevent EM fails therein.

What is claimed is:

1. A method comprising:
   accessing technology files for a specific technology node, design specifications for a design for an integrated circuit in the specific technology node, and library files for library elements in the design;
   defining protected zones around at least some of the library elements in the design, using the technology files, the design specifications, and the library files, the protected zones around at least two different library elements having different sizes; and,
   establishing placement of the library elements in the design relative to power rails in a power delivery network such that each library element is prevented from being placed in a protected zone around any other library element in order to avoid electromigration fails in the power delivery network.

2. The method of claim 1, the method further comprising, before the defining of the protected zones, performing power planning to define a power delivery network comprising power rails and the defining of the protected zones comprising:
   for a net in the design, using the technology files, the design specifications and the library files to determine values for multiple variables, the multiple variables comprising: an electromigration current limit; an activity factor; switching frequency; voltage; overlap capacitance; leakage power; dynamic power based on the activity factor, the switching frequency, the voltage and the overlap capacitance; total power amount based on the leakage power and the dynamic power, and maximum current carrying capacity of the power rails based on the electromigration current limit; and,
   for each one of the library elements in the net, determining a current consumption amount that is based on the total power amount and a ratio of the current consumption amount to the maximum current carrying capacity, wherein the protected zones are defined around any of the library elements having current consumption to maximum current carrying capacity ratios that are greater than a predetermined threshold ratio.

3. The method of claim 2, further comprising, when the maximum current carrying capacity is less than a product of the current consumption amount and the ratio of the current consumption amount to the maximum current carrying capacity for any of the library elements, repeating the performing of the power planning before defining the protected zones.

4. The method of claim 2, the different sizes depending upon the current consumption to maximum current carrying capacity ratios of the different library elements.

5. The method of claim 2, further comprising, after the establishing of the placement of the library elements, synthesizing a clock distribution network for the integrated circuit, the synthesizing being performed using the multiple variables to avoid additional electromigration fails in the clock distribution network.

6. The method of claim 5, further comprising:
   before the performing of the power planning, performing floorplanning;
   after the performing of the power planning, performing input/output pin placement;
   after the synthesizing of the clock distribution network, performing the following processes: a wire routing process, a timing and signal integrity verification process, a physical verification process, and an electromigration and voltage drop verification process; and,
   when the design fails the electromigration and voltage drop verification process, adjusting design rules used to define the protected zones and reworking the design starting with redesigning the power delivery network.

7. The method of claim 1, the library files containing timing information for the library elements and the placement of the library elements being established based on the library files such that the placement of the library elements is also timing optimized.

8. A system comprising:
a memory storing technology files for a specific technology node, design specifications for a design for an integrated circuit in the specific technology node, and library files for library elements in the design; and,
a processor in communication with the memory, the design comprising library elements, and the processor performing the following:
accessing, from the memory, the technology files, the design specifications and the library files;
defining protected zones around at least some of the library elements in the design using the technology files, the design specifications, and the library files, the protected zones around at least two different library elements having different sizes; and
establishing placement of the library elements in the design relative to power rails in a power delivery network such that each library element is prevented from being placed in a protected zone around any other library element in order to avoid electromigration fails in the power delivery network.

9. The system of claim 8, the processor performing power planning to define a power delivery network comprising power rails prior to defining the protected zones and the processor defining the protected zones by performing the following:
for a net in the design, using the technology files, the design specifications and the library files to determine values for multiple variables, the multiple variables comprising: an electromigration current limit; an activity factor; switching frequency; voltage; overlap capacitance; leakage power; dynamic power based on the activity factor, the switching frequency, the voltage and the overlap capacitance; total power amount based on the leakage power and the dynamic power, and maximum current carrying capacity of the power rails based on the electromigration current limit; and,
for each one of the library elements in the net, determining a current consumption amount that is based on the total power amount and a ratio of the current consumption amount to the maximum current carrying capacity, wherein the protected zones are defined around any of the library elements having current consumption to maximum current carrying capacity ratios that are greater than a predetermined threshold ratio.

10. The system of claim 9, the processor further repeating the performing of the power planning before defining the protected zones, when the maximum current carrying capacity is less than a product of the current consumption amount and the ratio of the current consumption amount to the maximum current carrying capacity for any of the library elements.

11. The system of claim 9, the different sizes depending upon the current consumption to maximum current carrying capacity ratios of the different library elements.

12. The system of claim 9, the processor further synthesizing a clock distribution network for the integrated circuit after the placement of the library elements is established, the synthesizing being performed using the multiple variables to avoid additional electromigration fails in the clock distribution network.

13. The system of claim 12,
before the performing of the power planning, the processor performing floorplanning, after the performing of the power planning, the processor performing input/output pin placement, after the synthesizing of the clock distribution network, the processor performing the following processes: a wire routing process, a timing and signal integrity verification process, a physical verification process, and an electromigration and voltage drop verification process; and,
when the design fails the electromigration and voltage drop verification process, the processor adjusting design rules used to define the protected zones and reworking the design starting with redesigning the power delivery network.

14. The system of claim 9, the library files containing timing information for the library elements and the placement of the library elements being established based on the library files such that the placement of the library elements is also timing optimized.

15. A computer program product for integrated circuit design, the computer program product comprising a non-transitory computer readable storage medium having program instructions embodied therewith, the program instructions being executable by a processor to cause the processor to perform a method, the method comprising:
accessing, from memory, technology files for a specific technology node, design specifications for a design for an integrated circuit in the specific technology node, and library files for library elements in the design;
defining protected zones around at least some of the library elements in the design, using the technology files, the design specifications, and the library files, the protected zones around at least two different library elements having different sizes; and,
establishing placement of the library elements in the design relative to power rails in a power delivery network such that each library element is prevented from being placed in a protected zone around any other library element in order to avoid electromigration fails in the power delivery network.

16. The computer program product of claim 15, the method further comprising, before the defining of the protected zones, performing power planning to define a power delivery network comprising power rails and the defining of the protected zones comprising:
for a net in the design using the technology files, the design specifications and the library files to determine values for multiple variables, the multiple variables comprising: an electromigration current limit; an activity factor; switching frequency; voltage; overlap capacitance; leakage power; dynamic power based on the activity factor, the switching frequency, the voltage and the overlap capacitance; total power amount based on the leakage power and the dynamic power, and maximum current carrying capacity of the power rails based on the electromigration current limit; and,
for each one of the library elements in the net, determining a current consumption amount that is based on the total power amount and a ratio of the current consumption amount to the maximum current carrying capacity, wherein the protected zones are defined around any of the library elements having current consumption to maximum current carrying capacity ratios that are greater than a predetermined threshold ratio.

17. The computer program product of claim 16, the method further comprising, after the establishing of the placement of the library elements, synthesizing a clock distribution network for the integrated circuit, the synthesizing being performed using the multiple variables to avoid additional electromigration fails in the clock distribution network.

18. The computer program product of claim 16, the different sizes depending upon the current consumption to maximum current carrying capacity ratios of the different library elements.

19. The computer program product of claim 16, the method further comprising synthesizing a clock distribution network for the integrated circuit after the placement of the library elements is established, the synthesizing being performed using the multiple variables to avoid additional electromigration fails in the clock distribution network.

20. The computer program product of claim 19, the method further comprising:
- before the performing of the power planning, performing floorplanning;
- after the performing of the power planning, performing input/output pin placement;
- after the synthesizing of the clock distribution network, performing the following processes: a wire routing process, a timing and signal integrity verification process, a physical verification process, and an electromigration and voltage drop verification process; and,
- when the design fails the electromigration and voltage drop verification process, adjusting design rules used to define the protected zones and reworking the design starting with redesigning the power delivery network.

* * * * *